March 26, 1946.  J. E. RAYMOND  2,397,203
PROTECTIVE DEVICE
Filed Aug. 19, 1944

WITNESSES:

INVENTOR
John E. Raymond.
BY
ATTORNEY

Patented Mar. 26, 1946

2,397,203

UNITED STATES PATENT OFFICE 2,397,203

PROTECTIVE DEVICE

John E. Raymond, Hamilton, Ontario, Canada, assignor to Westinghouse Electric Corporation, East Pittsburgh, Pa., a corporation of Pennsylvania Application August 19, 1944, Serial No. 550,182

6 Claims. (Cl. 175—294)

My invention relates to a trip circuit and, particularly, to a self-protecting trip system for protecting heavy duty electrical apparatus.

In the operation of heavy duty electrical devices such as, vapor-electric converters, transformers, generators, motors, etc., having a high replacement cost, it is customary to protect the apparatus by means of numerous automatic relays such as overload relays, vacuum relays, and relays related to other fault conditions in the apparatus. In the event of fault in the apparatus, the fault current rapidly rises to a value which will destroy all or portions of the apparatus unless the protective systems are positively operative. Heretofore there has been considerable destruction of equipment because of failure of the protective devices to open the power connections before the undesirable rise in current has occurred.

According to my invention, I provide a protective system which will positively operate to remove the power connection in the event of failure of the normal trip circuit. According to my invention, the normal trip circuit is provided with a self-protecting trip which is so connected that in the event of the failure or termination of operating current to the normal trip coil, the protective circuit will operate to disconnect the apparatus.

It is an object of my invention to provide a self-protecting tripping system for protecting electrical apparatus.

It is a further object of my invention to provide a self-protecting trip circuit for a vapor-electric converter.

It is a further object of my invention to provide a trip circuit that will positively operate a circuit breaker.

It is a further object of my invention to provide a protective relay operative in the event of failure of the normal trip circuit.

Figure 1:
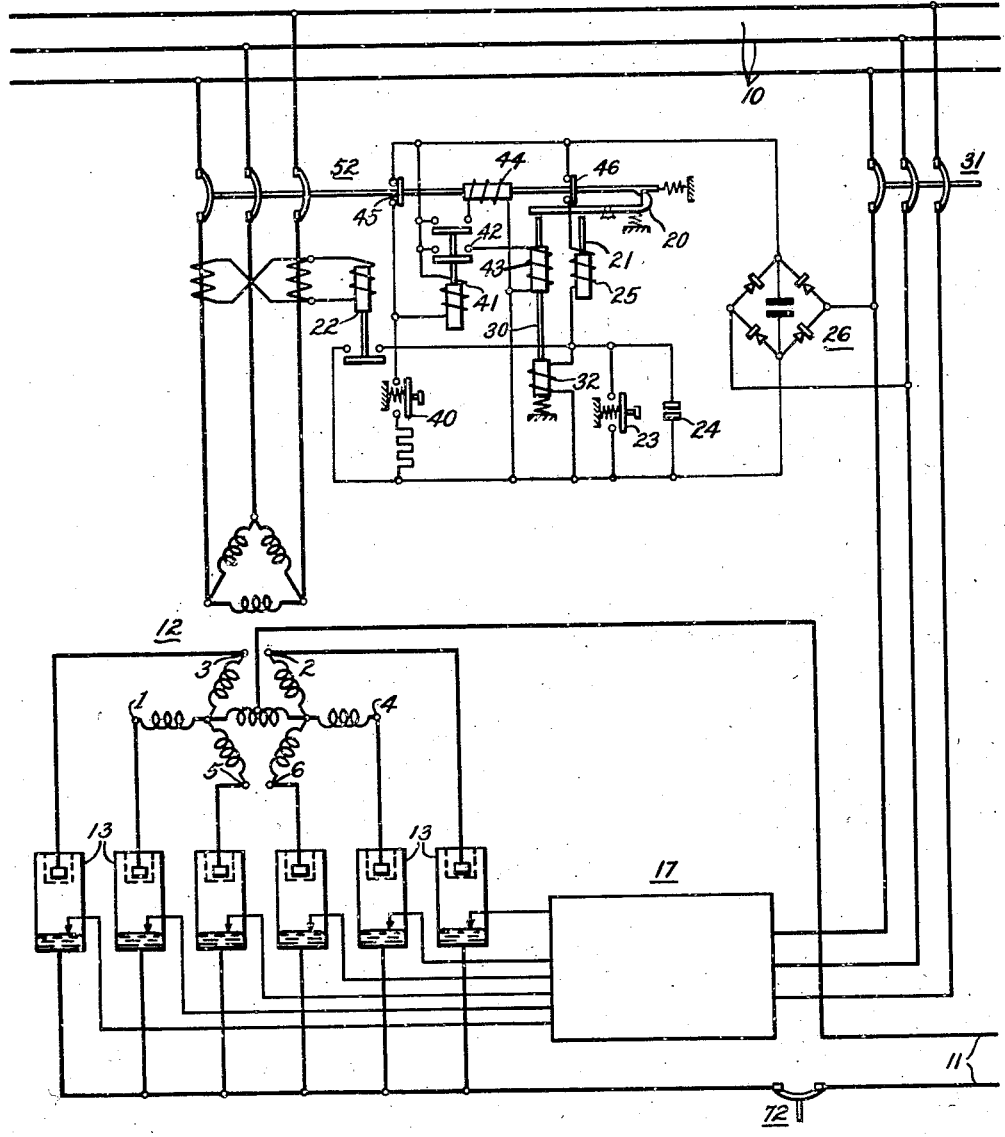
Figure 2:
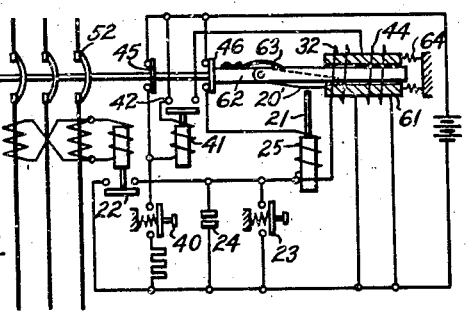

Other objects and advantages of my invention will be apparent from the following detailed description taken in conjunction with the accompanying drawing, in which:

Figure 1 is a schematic illustration of a vapor-electric converter embodying my invention, and Fig. 2 is a fragmentary view of a modification according to my invention.

In the exemplary embodiment of my invention according to Fig. 1, an alternating-current circuit 10 is connected to a direct-current circuit 11 through a rectifier transformer 12, and the flow of current between the circuits is controlled by means of a plurality of vapor-electric valves 13 connected to the secondary terminals 1 to 6 of the rectifier transformer 12. The direct-current circuit 11 is provided with a protective circuit breaker 72, and the alternating-current circuit is provided with a protective breaker 52. The breaker 52 is of the type which is normally biased to an open position and is maintained in closed position by a suitable holding device, herein illustrated as a mechanical latch 20, although any suitable device for holding in the breaker 52 may be utilized.

The holding mechanism is provided with a trip herein illustrated as a solenoid operated plunger 21 which is actuated from any suitable source such as an overload relay 22 connected to the alternating-current circuit or a manual trip switch 23 or, in fact, by any control relay, such as 24, which may be actuated in response to any condition in the apparatus. The actuating winding 25 of the trip device 21 is supplied with current, usually direct current, from any suitable source and is herein disclosed as being supplied with direct current through a full wave rectifier 26 from a control supply for the impulsing system 17 of the converter which is, in turn, connected to the alternating-current circuit 10 by means of circuit breaker 31.

In relays as heretofore used, the coil 25 of the trip mechanism is energized by the closing of any of the parallel connected contacts 22, 23, 24, and the flow of current through the coil 25 moves the mechanism into tripping position. However, in the event of power failure from the source 26 or an open circuit or incomplete circuit anywhere in the system, such a mechanism fails to operate and may result in the destruction of the converter equipment.

To protect the trip mechanism against such accidents, I have provided a second trip mechanism 30, herein illustrated as of the spring biased variety, normally tending to move into tripping position. The second or protective trip mechanism 30 is held in cocked position against the bias of the mechanism by means of a holding coil 32 which is preferably connected in series with the winding 25 of the normal trip circuit and in shunt with the control contacts 22—24 of the normal trip circuit. The holding coil 32 is energized to hold the secondary trip mechanism 30 in cocked position with a flow of current much less than is necessary to actuate the normal trip mechanism 21. In this manner, the series connected coils 25 and 32 will both be traversed by the holding current, and so long as the power supply and the circuit remain in operative condition, the holding coil 32 will retain the biased mechanism in the inoperative position, and the flow of holding current will not actuate the normal trip device 21.

It is thus seen that power failure or failure of the normal trip control circuits will automatically release the protective trip mechanism and release the holding mechanism for the main breaker 52 and thereby remove power from the converter. Also, since the holding coil 32 is in shunt with the various contacts 22—24 controlling the normal trip mechanism, the closure of any of these contacts will shunt out the holding current and release the protective mechanism 30 which will move to deenergize the holding mechanism regardless of the motion of the normal trip device. While it is true that while normal operation of all devices is maintained, it will be impossible to tell whether the protective trip or the normal trip released the breaker. The two, in general, provide a positive release regardless of any failure of any part of the protective equipment.

Since the holding coil is of such a value that it will not reset the protective trip mechanism 30, it is necessary to provide some means for resetting the protective trip mechanism 30 after each actuation of the device. It is also desirable to provide means for automatically or manually resetting the circuit breaker 52 after tripping. I have, accordingly, provided a reset arrangement in which a contactor herein illustrated as a push button 40 but which may be the contacts of any supervisory device is utilized to energize the coil 41 of a resetting relay which closes contacts 42 to energize a reset coil 43 on the protective trip mechanism 30 and simultaneously a reset coil 44 on the circuit breaker 52. Preferably the circuit breaker 52 is provided with a contact 45 which is operative when the breaker 52 is in the closed position to short circuit the resetting relay 41 so that its contacts 42 will open and prevent energization of the resetting coils 43—44 which might otherwise interfere with the positive operation of the protective mechanism.

In the normal operation of my device, the push button 40 will be actuated to close the circuit breaker 52 and to cock the protective trip mechanism 30. Then, in the event of any failure or fault condition which would close one of the contacts 22—24 in series with the normal tripping relay 21, energy would flow from the power source through the relay and actuate the tripping mechanism. However, in the event of any failure of the tripping mechanism or the supply current therefor, the protective trip 30 would operate to trip the circuit breaker 52 and prevent any damage to the apparatus.

As the contacts of relay 22 to 24 are generally not capable of interrupting the trip current without injury to the contacts, I prefer to provide an auxiliary contact 46 associated with the breaker 52 for positively breaking the trip circuit after actuation of the breaker 52 to the open position.

In order to eliminate the remote possibility of the latch 20 failing mechanically to release the breaker contacts, the holding coil 32 may be directly applied to the breaker closing element, as shown in Fig. 2. In this modification the breaker is actuated, against gravity or a compression spring 60, by an armature 61 telescoped on the actuating rod 62, the rod 62 and armature 61 being latched together by a latch 20' under the influence of a spring 63.

In the operation of this modification, the armature 61 and actuating rod 62 are normally latched together by latch 20'. Closing of switch 40 energizes relay 41 which in turn energizes closing coil 44 moving the breaker to the closed position at which time contact 46 energizes holding coil 32 in series with the normal trip coil 25, and contact 45 deenergizes relay 41 removing the supply from closing coil 44. Holding coil 32 then retains the breaker in the closed position if the trip circuit is properly energized. Closing of any relay 22 to 24 will energize trip coil 25 so that the plunger 21 disengages latch 20' from the armature 61, allowing the rod 62 to telescope through the armature 61. Simultaneously, the closing of relays 22 to 24 short circuits the holding coil 32, permitting the armature 61 to drop back to the starting position under the influence of springs 64 so that the breaker 52 will be opened either by the trip device 21 or by the release of the holding coil 32 which ever acts fastest, and in the event of failure of power or an incomplete trip circuit, the breaker will open because of the deenergization of the holding coil 32.

While for purposes of illustration I have shown and described my invention, as applied to particular systems of connections and as embodying various devices diagrammatically shown, it will be apparent to those skilled in the art that changes and modifications can be made therein without departing from the true spirit of my invention.

I claim as my invention:

1. A tripping system for a breaker comprising a latch for maintaining said breaker in closed position, a tripping coil for actuating said latch to release said breaker, said tripping coil being normally deenergized, a second tripping coil, said second tripping coil being normally energized, a source of energizing potential for said tripping coils and switching means for simultaneously energizing said normally deenergized coil and deenergizing said normally energized coil.

2. A protective system for electrical apparatus comprising a disconnecting switch biased to opening position, holding means for maintaining said switch in closed position, a tripping device to release said holding means, a winding for actuating said tripping device, a source of potential for supplying current to said winding, fault responsive switching means for connecting said winding across said source, a mechanical means biased to release said holding means, a winding for restraining operation of said mechanical means, said winding being connected in shunt with said fault responsive switching means.

3. A protective system for electrical apparatus comprising a disconnecting switch biased to opening position, holding means for maintaining said switch in closed position, a tripping device to release said holding means, a winding for actuating said tripping device, a source of potential for supplying current to said winding, fault responsive switching means for connecting said winding across said source, a mechanical means biased to release said holding means, a winding for restraining operation of said mechanical means, said restraining winding operating at a current less than the current required to operate said actuating winding, said restraining winding and said actuating winding being connected in series across said source and switching means in shunt with said restraining winding.

4. A protective system for electrical apparatus comprising a circuit breaker in the power supply of said apparatus, a latch for maintaining said breaker in closed position, a tripping mechanism for said latch, an actuating coil for operating said tripping mechanism, a spring actuated tripping mechanism for said latch, a holding coil acting when energized to hold said spring actuated tripping mechanism inoperative, a source of potential for said coils and switching means for energizing said actuating coil and deenergizing said holding coil.

5. A self-protecting trip system for an electrical device comprising a circuit breaker in the power supply of said device, latch means for maintaining said circuit breaker in closed position, a tripping mechanism for disengaging said latch, an actuating coil for said tripping mechanism, a second releasing mechanism, a holding coil for said second releasing mechanism, a source of actuating potential for said coils, said actuating coil and said holding coil being connected in series relation across said source, and relay means for shorting out said holding coil and connecting said actuating coil directly across said source.

6. A protective system for electrical apparatus energized from an electrical supply circuit comprising a circuit breaker connected in series with said apparatus, means for holding said circuit breaker in closed position, means for disengaging said holding means to permit opening of the breaker, an actuating coil for said holding means and an actuating coil for said disengaging means, circuit means for applying current to said coils in series and relay means for shorting out the coil of said holding means.

JOHN E. RAYMOND.